Patented May 11, 1954

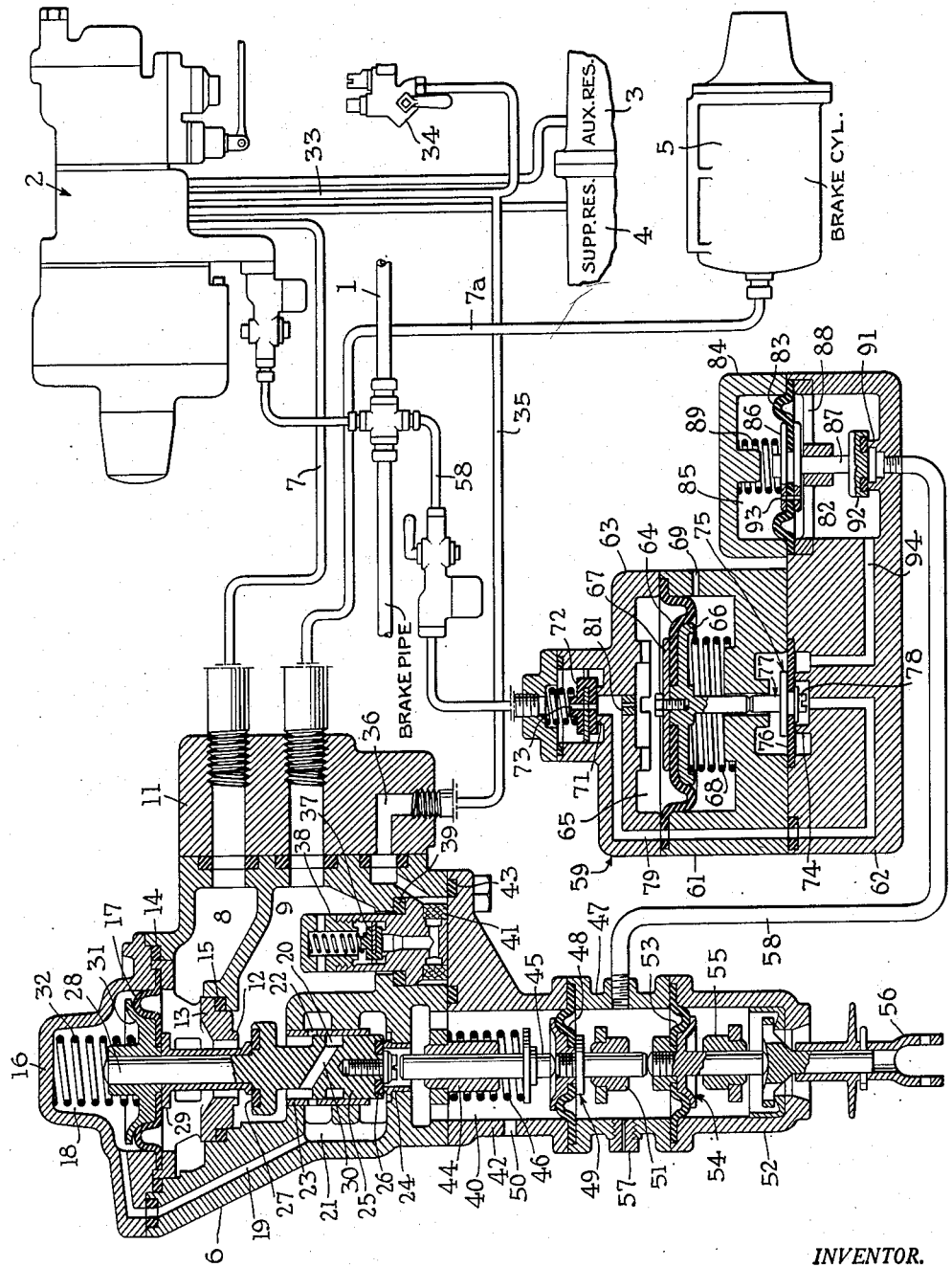

2,678,242

UNITED STATES PATENT OFFICE 2,678,242

MOTOR OPERATED BRAKE CYLINDER RELEASE VALVE

Mark Pickert, Watertown, N. Y., assignor to The New York Air Brake Company, a corporation of New Jersey Application January 7, 1952, Serial No. 265,244

4 Claims. (Cl. 303—68)

This invention relates to means whereby the brake cylinder release valves on a train can be operated by manipulation of the engineer's brake valve.

Brake cylinder release valves are primarily intended for use in switching operations in the yard. When a train is to be broken up into its individual cars, it would be desirable for the engineer to be able to release the pressure in the brake cylinders of the entire train, thus doing away with the necessity of a brakeman's opening the release valves by individual manipulation.

According to the present invention a brake cylinder release valve, of the type controlled by a normally inert pressure motor, is provided with a fluid pressure motor arranged to move the valve to release position. This fluid pressure motor is controlled in its operation by a charging valve, which permits the motor to be energized only when the system is being recharged, after an emergency application of the brakes. Thus it will be seen that normal service braking operation of the system is not affected.

The invention will be described having reference to the accompanying drawing in which is shown the equipment for a single car.

The preferred embodiment includes a brake pipe 1, an automatic control valve 2, the combined auxiliary and supplemental reservoirs 3 and 4 respectively, and the brake cylinder 5. The control valve 2 is of the well known AB type which is standard equipment on freight trains in this country. A brake cylinder release valve is interposed in the brake cylinder connection 7 between the control valve 2 and the brake cylinder 5. The main body portion of the release valve is shown at 6 and is in the form of a cored casting having a chamber 8 and a chamber 9. The body 6 is mounted on pipe bracket 11 which has chambers in free communication respectively with chambers 8 and 9 and in effect a part thereof. The brake cylinder pipe 7 from the control valve 2 connects with bracket 11 and is in communication with the chamber 8. Chamber 9 is in communication with the brake cylinder 5 through the pipe 7a which is connected to the bracket 11.

The chambers 8 and 9 are separated by a downward presented valve seat 12. This seat 12 is shown as formed on a spider 13 which is sealed by gaskets 14 and 15 and which is clamped by a cap 16.

Cap 16 is bolted to the top of housing 6 and clamps the peripheral margin of flexible diaphragm 17 shown as of the slack or corrugated type.

The diaphragm 17 is subject on one face to the pressure in chamber 8 and on its other face to the pressure in the chamber 18. Chamber 18 is connected by passage 19 with a chamber 21 formed in the body 6. The chambers 21 and 9 normally communicate with each other through the radial ports 22 in the bushing 23 which is pressed into an opening between these chambers. When the release valve is in abnormal or releasing position the chambers 21 and 9 communicate through the ports 22 and the annular recess 20 and the drilled port 30 in the valve body 25.

Exhaust flow from the chamber 21 is controlled by an upward presented valve seat 24. The valve body 25 is guided in the bushing 22 and carries on its lower end a rubber valve face 26 which normally seats against the valve seat 24. It also carries at its upper end a rubber valve face 27 which may close against the valve seat 12 when the valve 26 is lifted from its seat 24.

A valve stem 28 extends upward through the center of diaphragm 17 and is clamped to the diaphragm by a flanged sleeve 29 and a thrust plate 31. A spring 32 reacts between the thrust plate 31 and cap 16 and exerts a moderate bias on the valve body 25 to urge it against the seat 24.

The brake cylinder exhaust connection 33 from the control valve 2 is provided with a retainer 34. The retainer 34 is manually adjustable so as to retain a selected pressure in the brake cylinder 5 when the control valve 2 is in release position. A secondary exhaust 35 extends between the connection 33 and the cored passage 36 in the pipe bracket 11. Flow through this connection 35 is controlled by a normally closed, spring loaded check valve 37.

The check valve includes a body 38 mounted in a bore in release valve body 6 and which is sealed against leakage through the bore by a gasket 39. A filter 41 is provided to protect the valve against the entrance of foreign matter. The check valve assembly is held in place by a filler piece 42 which is bolted to the body 6. The bore 40 which extends through piece 42 has a vent 50. A gasket 43 prevents leakage from passage 36 to atmosphere. A guide block 44 is pressed into the lower face of the body 6 and has an axial bore in which an actuating stem 45 is reciprocable. A spring 46 exerts a downward bias on the stem 45.

The apparatus described up to this point is conventional and is described and claimed in the Klein Patent Number 2,444,993 which was issued on July 13, 1948, to applicant's assignee.

Fastened to the lower face of the filler piece 42 is a motor cylinder member 47. A slack diaphragm 48 is clamped at its periphery between these pieces. Located centrally of the diaphragm 48 is a thrust rod and plate assembly 49. The assembly 49 is guided by and reciprocable in an apertured block 51 located in the motor cylinder 47.

Fastened to the lower face of the cylinder 47 is an end member 52. A second slack diaphragm 53 is clamped at its periphery between the cylinder 47 and the member 52. The diaphragm 53 is clamped at its center by a thrust rod and plate assembly 54 which is guided in the block 55. Mounted in the lower end of the end member 52 is the universally tiltable head of the forked operating lever 56.

The motor cylinder 47 is provided with restricted exhaust 57. The motor is supplied with air from brake pipe 1 through a pipe 58 and the charging valve 59 interposed in that pipe.

The charging valve 59 comprises a main body portion 61, a valve seat portion 62 and cap 63. A slack diaphragm 64 is clamped at its periphery between the portion 61 and the cap 63. The diaphragm 64 defines a working chamber 65 between its upper face and a suitable recess in the cap 63. The diaphragm 64 is centrally apertured and clamped between a combined plate and push rod assembly 66 and a follower plate 67. A spring 68 reacts between the assembly 66 and the portion 61 and exerts an upward bias on diaphragm 64. The clearance volume between the diaphragm 64 and portion 61 is vented to atmosphere through a drilled port 69.

The cap piece 63 is provided with an upward presented valve seat 71 against which a check valve 72 is spring biased. A restricted port 73 extends through the valve 72.

The valve seat portion 62 is provided with an annular rib 74 which serves as a valve seat for a flexible diaphragm type valve 75. This valve includes a diaphragm 76 clamped at its periphery between the portions 61 and 62. A thrust rod and plate 77 is clamped to the center of diaphragm 76 by a bolt 78 which extends through the center of the diaphragm. The thrust rod 77 is engaged by the push rod of assembly 66 when the latter is in its lower position whereby valve 75 is held against its seat.

A passage 79 extends between the valve seats 71 and 74 and is in restricted communication with the chamber 65 through a choke 81 which is somewhat smaller than the port 73.

A second motor chamber 82 is provided in the valve seat portion 62. A slack diaphragm 83 is clamped at its periphery between the portion 62 and a cover 84. A working space 85 is defined between the cover 84 and diaphragm 83. The diaphragm 83 is clamped at its center between the follower plate 86 and the flanged valve stem 87 which is guided by a spider 88 clamped between the portion 62 and the cover 84. A spring 89 exerts a downward bias on the follower plate 86. Annular projection 91 serves as a seat for the rubber faced valve 92 carried by the valve stem 87. A port 93 affords restricted communication between the space 85 and chamber 82. A passage 94 affords a flow passage from the diaphragm valve 75 to the chamber 82.

During normal operation with the brake pipe 1 and the reservoirs 3 and 4 fully charged and the control valve 2 in release position, the brake cylinder 5 is vented through the retainer 34. Under these conditions the pressure in chamber 65 of the charging valve 59 overcomes the bias of spring 68 thus maintaining the valve 75 closed. The vent 57 is therefore effective to vent the motor cylinder 47 and the passages 58.

The bias of spring 68 is such that during normal service operations the valve 75 remains closed. If when the brakes are applied it is desired to release the pressure in the brake cylinder on any single car or group of cars this may be accomplished by pulling the lever 56 thus raising the valve 25 upward against the seat 12. This isolates the chamber 8 and the connection 7 and vents the brake cylinder 5, chamber 9 and the space 18 past valve seat 24 and through the vent 50. The pressure in chamber 8 acting on the diaphragm 17 maintains the valve 25 in its upper or abnormal position until the control valve 2 moves to release position and vents the chamber 8. It should be noted that the retainer setting does not interfere with the self-restoring feature of the release valve because the secondary exhaust is opened through the check valve 37 and past the valve seat 24 when the valve 25 is in its abnormal position.

When an emergency application is initiated by the engineer's brake valve or by a conductor's valve (neither of which is shown in the drawings), the brake pipe 1 is vented. Brake pipe pressure in the chamber 65 is vented at a restricted rate through the choke 81. The valve 75, therefore, remains closed until the pressure in the passage 79 is reduced sufficiently to preclude the pressure in the motor cylinder 47 rising to a value sufficient to raise the valve 25 and vent the brake cylinder 5.

With the brakes applied after an emergency application, the brake pipe 1 may be recharged by operation of the engineer's brake valve. When the brake pipe pressure starts to rise the bias of the spring 68 is sufficient to overcome the force acting downward on the diaphragm 64 whereby the latter is maintained in its upper position. Brake pipe pressure reacts on the diaphragm valve 75 and forces the latter off its seat 74. Pressure is thus admitted to chamber 82 and reacts on the diaphragm 83 and opens the valve 92 whereby pressure is admitted to the motor cylinder 47. The pressure in the cylinder 47 raises the valve 25 to its upper position and vents the brake cylinder in the same way as when the rod 56 is pulled. It will be understood that the brake cylinder release valves throughout the train are thus moved to venting position.

When the brake cylinder release valves have been moved to venting position, the charging flow into the brake pipe may be discontinued. The train may then be broken up into its various cars.

If the pressure in the brake pipe continues to rise the bias of the spring 68 will be overcome and the valve 75 will be closed. When the valve 75 closes, the vent 57 permits the pressure in the motor cylinder 47 to be dissipated, so that the upward bias exerted by this motor on the valve 25 is removed. When the brake pipe pressure reaches the pressure necessary to move the control valve 2 to release position the brake cylinder release valves are automatically restored to normal position.

The valve 92 operates to prevent flow to the motor cylinder 47, unless the rate of flow is sufficient to build up a pressure in the motor cylinder which will be effective to actuate this motor. It will be noted that valve 92 opens when the pressure in chamber 82 is enough higher than the pressure in the space 85 to overcome the bias of the spring 89. The port 93 prevents a sufficient differential being developed unless an adequate rate of flow to operate the valve motor is entering the chamber 82.

The specification contains several statements of direction. These relate to the invention as shown in the drawing, and may vary with the particular installation.

The preferred embodiment has been described in some detail, however, the inventive concept is not limited to this particular embodiment and no limitation to this construction is implied other than is expressed in the claims.

What is claimed:

1. In an automatic air brake system the combination of a brake pipe; an auxiliary reservoir; an automatic control valve having a brake cylinder connection; a brake cylinder connected with the brake cylinder connection; a release valve mechanism interposed in said connection, said mechanism comprising a dual valve having a normal position in which it opens said connection and an abnormal position in which it closes said connection and vents said brake cylinder, and fluid pressure responsive means serving to retain said dual valve in abnormal position when in said position and subject to brake applying pressure and to restore it to normal position when said pressure is released; normally inactive motor means serving when charged to shift said dual valve to abnormal position and having a charging connection thereto from said brake pipe; and a charging valve in said charging connection, said charging valve comprising a normally closed valve; a fluid pressure motor serving when charged with pressure in excess of a predetermined minimum to maintain the normally closed valve closed, means biasing said fluid pressure motor toward a position in which it is ineffective to hold said normally closed valve closed, and means affording a restricted connection between said fluid pressure motor and said charging connection.

2. The combination defined in claim 1 and a secondary valve interposed in said charging connection between said charging valve and said fluid pressure motor, said secondary valve comprising a housing enclosing a chamber; a movable abutment dividing said chamber into two spaces, one of which is in open communication with said charging connection, means affording restricted flow between said spaces, a valve connected with said abutment and means biasing said valve and abutment toward a position in which the valve closes said charging connection.

3. The combination defined in claim 1 and valve means interposed in said charging connection between said brake pipe and said restricted connection said valve means permitting free flow from said charging valve to said brake pipe and permitting a relatively restricted reverse flow.

4. The combination defined in claim 1 and manually operable means whereby said dual valve may be shifted to said abnormal position selectively by said manually operable means or by actuation of said motor means.

References Cited in the file of this patent

UNITED STATES PATENTS

| Number | Name | Date |
|---|---|---|
| 1,276,036 | Culling | Aug. 20, 1918 |
| 1,836,417 | Webster | Dec. 15, 1931 |
| 2,444,993 | Klein | July 13, 1948 |